A. A. JENNINGS.
Dumping Cart.
No. 73,725.  Patented Jan. 28, 1868.
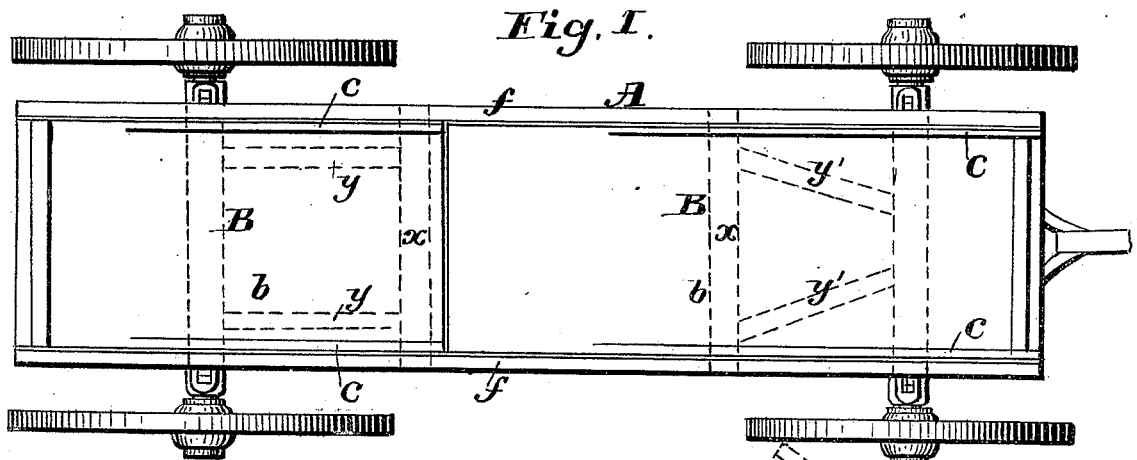
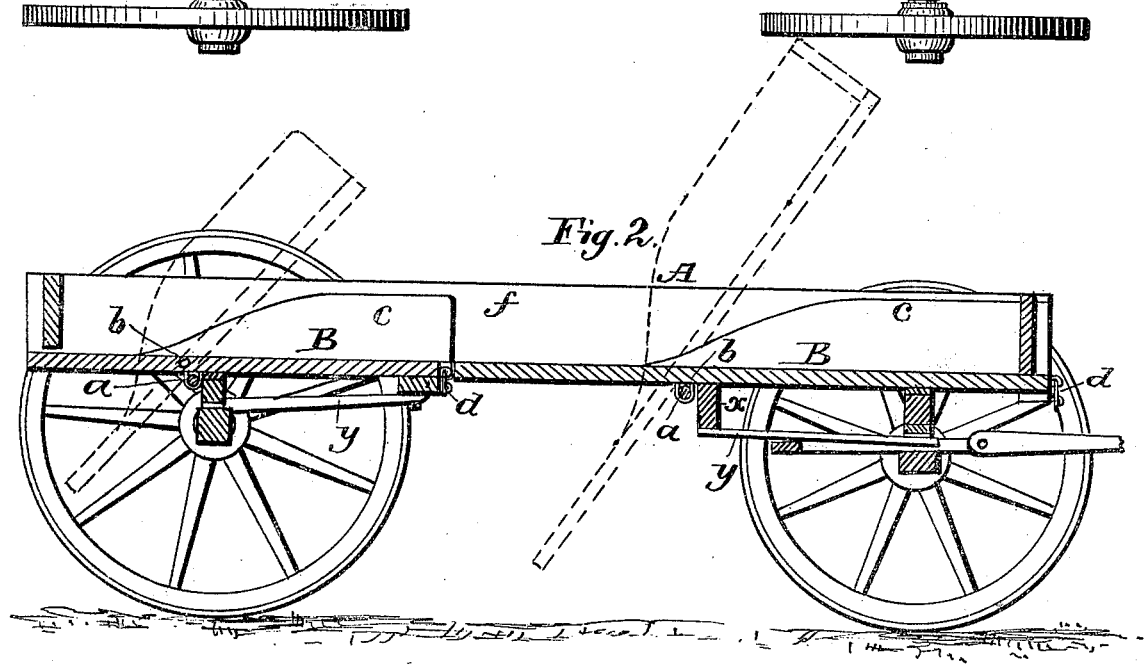
Witnesses:
J. A. Davis.
S. W. Moore
Inventor:
A. A. Jennings
By J. Fraser & Co
Atty.

United States Patent Office.

ASA A. JENNINGS, OF WEBSTER, NEW YORK.

Letters Patent No. 73,725, dated January 28, 1868.

---

IMPROVEMENT IN DUMPING-CART.

---

*The Schedule referred to in these Letters Patent and making part of the same.*

---

TO ALL WHOM IT MAY CONCERN:

Be it known that I, ASA A. JENNINGS, of Webster, in the county of Monroe, and State of New York, have invented a certain new and useful Improvement in Dumping-Carts or Wagons; and I do hereby declare that the following is a full and exact description thereof, reference being had to the accompanying drawings, making part of this specification.

Figure 1 is a plan of my improved cart or wagon.

Figure 2, a central vertical section of the same.

Like letters of reference indicate corresponding parts in both figures.

My invention consists in combining with an extended cart or wagon, two dumping-boxes, one in front of the other, so arranged that one dumps in the rear and the other in the middle, as hereinafter set forth.

As represented in the drawings, A is the body of a four-wheeled cart or wagon, mounted in the ordinary way. In this body are situated two boxes B B, turning vertically on bearings $a$ $a$, to dump, as indicated in fig. 2. These boxes consist of bottoms or floors $b$ $b$, which constitute the bottom of the cart or wagon-body, and side pieces $c$ $c$, which hold the load in place as it is being dumped. These sides preferably incline or taper down in the rear, so as to allow the load to expand laterally after being dumped. The heads of the dumping-boxes may be provided with any suitable fastening $d$, for holding them in place.

Dumping-carts or wagons mounted on two wheels are in common use, but as ordinarily made, such arrangements cannot be applied to four wheels. In the latter case, the body of the cart is so long that the proper balance cannot be attained. Therefore to unload such carts, the contents must be shovelled out, which is a slow and laborious operation.

By combining two boxes, one in front of the other, with the body, as before described, one dumping behind and the other in the middle, I am enabled to discharge the load as readily as in a two-wheeled cart. This arrangement is very convenient when it is desired to deposit the load in portions—one portion being deposited by one box and another by the other. It is also very convenient for carrying coal and other similarly weighed materials. In such cases, if desired, the body may be divided by partition to receive a certain weight, and a part may be dumped in one place and a part in another.

The side-boards $c$ $c$ are essential to properly retain the load, and prevent friction while dumping. Were it not for these, the contents would press outward and interfere with the raising of the boxes, and would also fall or discharge improperly in front. The incline or taper of the side-boards is also necessary to allow the load to expand laterally when dumped, especially in the front box. By making the boxes serve as the bottom of the cart-body, I am enabled to construct the cart very cheaply.

In this construction, I avoid the employment of the usual reach beneath the cart-body, by making the sides $f$ $f$ of the body stiff to answer the same purpose. Transverse pieces $x$ $x$, connect them together, and these being also connected by the longitudinal braces $y$ $y$ and $y'$ $y'$, with the bolster above the axles, all the purposes of a reach are served, with the advantages of greater strength, and by this means there is no obstruction to the dumping of the boxes.

It is obvious that this arrangement of the dumping-boxes may be applied on runners in the same manner as on wheels.

What I claim as my invention, is—

In combination with the pivoted sections B B, the rigid sides $f$ $f$ of the body A, and the transverse and longitudinal braces $x$ $x$ and $y$ $y'$, connecting the same with the bolsters, substantially as and for the purposes set forth.

In witness whereof, I have hereunto signed my name in the presence of two subscribing witnesses.

ASA A. JENNINGS.

Witnesses:
R. F. OSGOOD,
J. A. DAVIS.